(12) United States Patent
Yamada

(10) Patent No.: US 6,556,213 B1
(45) Date of Patent: Apr. 29, 2003

(54) IMAGE DISPLAY HAVING FUNCTION OF PERFORMING INTERPOLATION PROCESS BY WHICH OUTLINE IS NOT BLURRED EVEN WHEN ORIGINAL IMAGE IS ENLARGED

(75) Inventor: Yukimitsu Yamada, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 389 days.

(21) Appl. No.: 09/603,944

(22) Filed: Jun. 27, 2000

(30) Foreign Application Priority Data

Jun. 28, 1999 (JP) .......................................... 11-181950

(51) Int. Cl.[7] ............................................... G09G 5/00
(52) U.S. Cl. ...................................... 345/609; 345/671
(58) Field of Search ................................ 345/609, 606, 345/607, 608, 611, 610

(56) References Cited

U.S. PATENT DOCUMENTS 5,737,101 A * 4/1998 Ito ............................ 345/525
6,339,434 B1 * 1/2002 West et al. ................. 345/667

FOREIGN PATENT DOCUMENTS

JP 4-264493 9/1992
JP 9-214864 8/1997

* cited by examiner

*Primary Examiner*—Matthew Luu
(74) *Attorney, Agent, or Firm*—Brinks Hofer Gilson & Lione

(57) ABSTRACT

Disclosed is an image display having the function of performing an interpolating process which does not make the outline blurred even when an original image is enlarged. In the case of interpolating n (n is a natural number) pixels between two neighboring pixels 1 and 2 in an input image signal, an interpolation value Zm as data of the mth (m is a natural number equal to or larger than n) interpolation pixel from the pixel 1 is selected within a range from Xm to Ym which are obtained by the following equations;

$$Xm = K1 + m(K1 - K0)/(n+1)$$

$$Ym = K2 + (n+1-m)(K2 - K3)/(n+1)$$

where, data of a pixel 0 adjacent to the pixel 1 on the side opposite to the pixel 2 is K0, data of the pixel 1 is K1, data of the pixel 2 is K2, and data of a pixel 3 adjacent to the pixel 2 on the side opposite to the pixel 1 is K3. The interpolation value is outputted to a display screen.

10 Claims, 4 Drawing Sheets

IMAGE DISPLAY HAVING FUNCTION OF PERFORMING INTERPOLATION PROCESS BY WHICH OUTLINE IS NOT BLURRED EVEN WHEN ORIGINAL IMAGE IS ENLARGED

BACKGROUND OF THE INVENTION

1. Field of the Invention

The present invention relates to a display of a liquid crystal, CRT, or the like and, more particularly, to an image display having the function of enlarging an image by increasing the number of pixels of an input image and displaying the image with higher resolution.

2. Description of the Related Art

In recent years, the resolution of various image displays and displays having a larger number of pixels have been developed. The pixel is defined here as a minimum unit of expressing a color. In the case of using three primary colors of R (red), G (green) and B (blue), a pixel consists of a set of three continuous dots of R, G, and B arranged in a column or a row. For example, in a liquid crystal display, the number of pixels has been increased from VGA (640 pixels in the horizontal direction×480 pixels in the vertical direction) to XGA (1024 pixels in the horizontal direction×768 pixels in the vertical direction). Further, SXGA (1280 pixels in the horizontal direction×1024 pixels in the vertical direction) is commercially available.

It is accordingly becoming more and more necessary to enlarge an input image of a low resolution of an NTSC signal (corresponding to pixels of 640 in the horizontal direction×500 in the vertical direction), a signal for a VGA liquid crystal display, or the like by increasing the number of pixels of the image so as to display an image of the increased number of pixels on a high-resolution screen. In this case, data of a pixel interpolated between pixels in an original image on a display screen is newly generated as an interpolation value. Proposed methods of obtaining an interpolation value include a method of using the same data as that of one of neighboring pixels in an original image and a method of obtaining an intermediate value of two neighboring pixels in an original image. Generally, the latter method of obtaining an intermediate value, that is, a linear interpolation process for obtaining a value on a straight line connecting two neighboring pixels is used.

FIG. 5 is a conceptual chart showing an algorithm of a linear interpolation process. In the chart, a case where the scaling factor of 2 of inserting one interpolation pixel between neighboring two pixels in an original image is shown in the range from a pixel 0 to pixel 3. The brightness will be described as data K of an image. The brightness values of interpolated pixels are calculated as intermediate values (K1+K2)/2, (K2+K3)/2 and (K3+K4)/2 on a straight line connecting K0 and K1, a straight line connecting K1 and K2 and a straight line connecting K2 and K3, respectively. A case of interpolating two or more pixels between neighboring pixels in an original image is quite similar. Values on a straight line connecting brightness data on both sides are used as interpolation values.

The conventional interpolating method is characterized in that a change in gradation of an original image is subjected to an enlarging process and an image with a smooth gradation change is obtained also on a high resolution display screen. On the other hand, an intermediate value is inserted even in a sharp edge portion in an original image, so that there is a problem such that the outline is blurred in the enlarged image on the display screen.

SUMMARY OF THE INVENTION

It is an object of the invention to solve the problem and to provide an image display comprising means for selecting an interpolation value so that an outline is not blurred in an enlarged image and means for displaying the enlarged image.

In order to achieve the object, an image display according to the invention comprises: means for selecting an interpolation value $Z_m$ as data of the mth (m denotes a natural number equal to or smaller than n) interpolation pixel from a pixel 1 within the range from $X_m$ to $Y_m$ which are obtained by the following equations, in the case where n (n is a natural number) pixels are interpolated between two neighboring pixels 1 and 2 in an input image signal, $$X_m = K1 + m(K1 - K0)/(n+1)$$

$$Y_m = K2 + (n+1-m)(K2 - K3)/(n+1)$$

where, data of a pixel 0 adjacent to the pixel 1 on the side opposite to the pixel 2 is K0, data of the pixel 1 is K1, data of the pixel 2 is K2, and data of a pixel 3 adjacent to the pixel 2 on the side opposite to the pixel 1 is K3; and means for outputting the interpolation value as data of a corresponding pixel on a display screen.

In the image display according to the invention, the value $Z_m$ is calculated by the following equation.

$$Z_m = (X_m + Y_m)/2$$

By those means, a clear image can be obtained while preventing the outline of an edge portion in an original image from being blurred in an enlarged image on a display screen.

The image display according to the invention further comprises means for adopting one of the data K1 and K2, which is closer to the value $Z_m$ as an interpolation value when the value $Z_m$ is out of the range from the data K1 to the data K2.

Consequently, an excessive correction, that is, what is called an overshoot occurring in the image display according to the invention can be prevented and insufficiency of the texture due to excessive sharpness of the outline can be compensated.

DETAILED DESCRIPTION OF THE PREFERRED EMBODIMENTS

Figure 1:
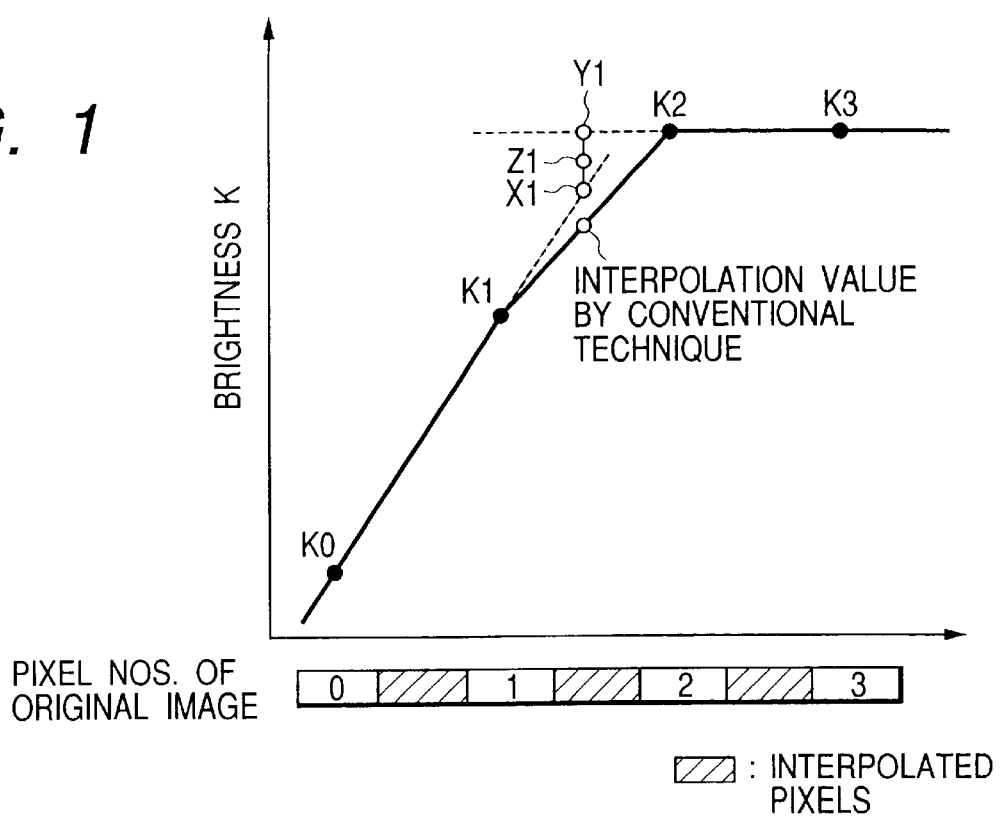
FIG. 1 is a conceptual chart showing an interpolation value determining method of a first embodiment of the invention.

An image display of the invention will be described hereinbelow with reference to the drawings. FIG. 1 is a conceptual chart showing an interpolation value determining algorithm of a first embodiment of the invention with respect to a case where the scaling factor is 2 and an interpolation pixel is inserted between two neighboring pixels in an original image. The chart represents the case where data K of an image relates to brightness.

In the case of obtaining data of an interpolation pixel to be inserted between pixels 1 and 2 in an original image, that is, an interpolation value between brightness K1 and brightness K2, a straight line connecting brightness K0 of a pixel 0 next to the pixel 1 and brightness K1 is extended from K1 to K2 and brightness X1 at an intermediate point of the pixels 1 and 2 on the line is obtained. Then a straight line connecting brightness K3 of a pixel 3 next to the pixel 2 and K2 is extended from K2 to K1 and brightness Y1 at an intermediate point of the pixels 2 and 3 is derived. X1 and Y1 are expressed by the following equations.

$$X1=K1+(K1-K0)/2$$

$$Y1=K2+(K2-K3)/2$$

An interpolation value Z1 to be adopted is selected on the basis of a specific reference within the range from X1 to Y1.

The sharpness of an edge portion, that is, the clearness of the outline and what is called the texture of an object have a trade-off relation. When the edge portion is too sharp, although a sharp image can be obtained, it is evaluated that the image has poor texture. A proper degree of sharpness varies according to an object to be displayed. In the image display of the invention, on the basis of the degree of sharpness adapted to a display image as a reference, a specific value Z1 within the range from X1 to Y1 is determined and is used as an interpolation value.

For example, in the case where a change in brightness of the original image can be approximated by an upward arc curve as shown in FIG. 1, when the upper limit value Y1 is adopted, the image becomes sharp. When the lower limit value X1 is used, although the image is sharper than that of the conventional method, the effect is slightly reduced. In the case where a change in brightness of the original image can be approximated by a downward arc curve, on the contrary, Y1 is the lower limit value and X1 is the upper limit value. In a manner similar to the above, when Y1 is selected, the image becomes sharper. In the first embodiment, an intermediate value of X1 and Y1 is adopted as Z1 which is obtained as follows.

$$Z1=(X1+Y1)/2$$

In a similar manner, the brightness of a pixel to be interpolated between the pixels 2 and 3 of the original image is obtained from K1, K2, K3 and K4 including brightness data of pixels 1 and 4 adjacent to the pixels 2 and 3. In such a manner, the brightness of each interpolating pixel is determined. Although the case of inserting an interpolation pixel between neighboring two pixels in an original image has been described above, substantially the same idea can be also applied to a case of interpolating two or more pixels between two pixels. For example, in the case of interpolating (n) pixels between the pixels 1 and 2, as brightness Zm of the (m) th interpolation pixel from the pixel 1, an intermediate value of brightness Xm derived from the brightness values K1 and K2 of the pixels 1 and 2, and brightness Ym derived from the brightness values K2 and K3 of the pixels 2 and 3 may be used. Xm, Ym and Zm in this case are expressed by the following expressions obtained by generalizing the equation of the case where the number of the interpolation pixel is one.

$$Xm=K1+m(K1-K0)/(n+1)$$

$$Ym=K2+(n+1-m)(K2-K3)/(n+1)$$

$$Zm=(Xm+Ym)/2$$

Figure 2:
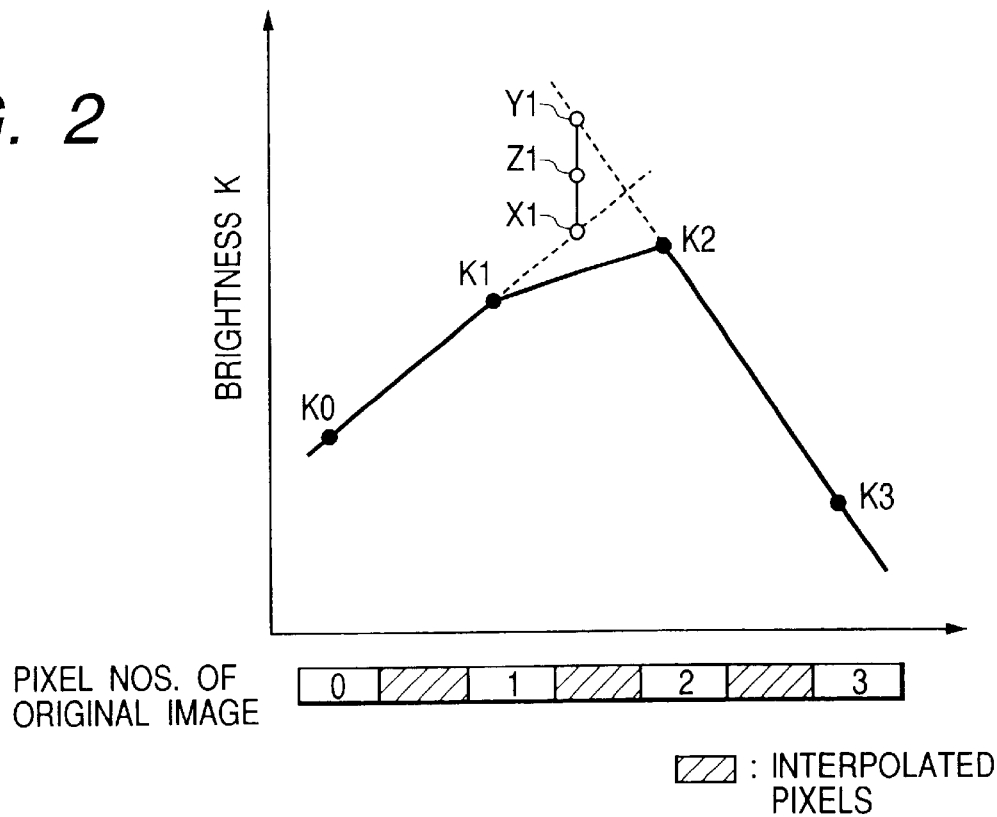
FIG. 2 is a conceptual chart showing an interpolation value determining method of a second embodiment of the invention.

FIG. 2 is a conceptual chart showing the algorithm of the second embodiment. In a manner similar to FIG. 1, the brightness data will be described as an example with respect to the case where the scaling factor is 2. When Zm is determined by the method of the first embodiment, in an area having a large change in brightness especially in an edge portion of an original image, as shown in FIG. 2, there is the possibility that Zm is out of the range from the brightness K1 to the brightness K2 of the adjacent pixels in the original image.

When Zm is used as it is as an interpolation value, the edge portion of the image is displayed more sharply. Although there is a displaying method utilizing the point, usually, it is not preferable since the texture of the object deteriorates. In the second embodiment, in this case, either the brightness value K1 or K2 which is closer to the calculated value Zm is used as an interpolation value. Consequently, an image of a clear outline can be obtained without deteriorating the texture of the original image.

Figure 3:
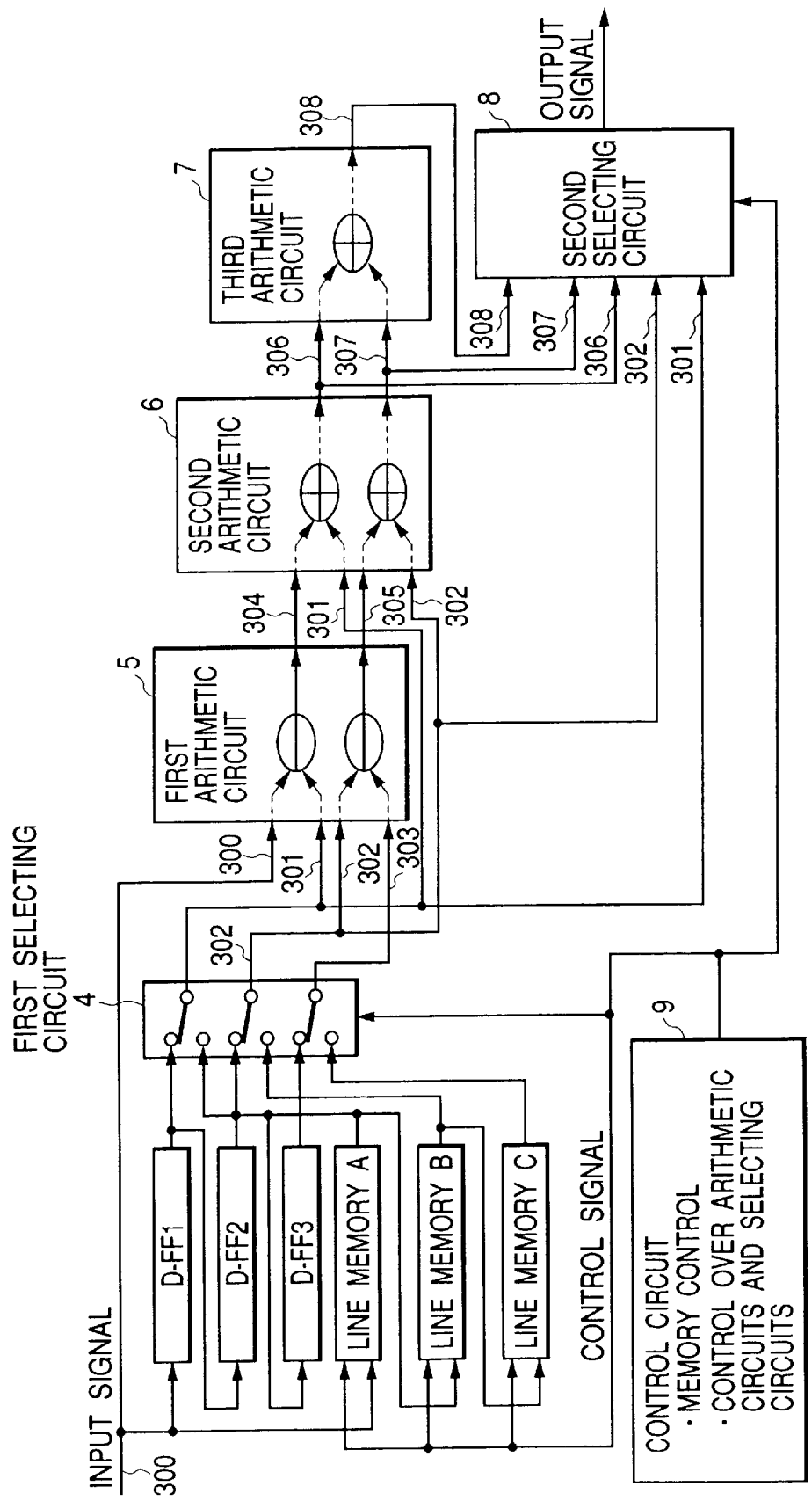
FIG. 3 is a circuit block diagram of the second embodiment of the invention.

FIG. 3 is a block diagram of circuits in a display in the second embodiment of the invention, for selecting an interpolation value and outputting the interpolation value to a display screen. The apparatus comprises: three data flip-flops D-FF1 to D-FF3 each for delaying an input signal by one clock and outputting a resultant signal; three line memories A to C each for storing data of one line; first to third arithmetic circuits 5 to 7 for performing adding and subtracting processes; first and second selecting circuits 4 and 8 for comparing and selecting input/output values; and a control circuit 9 for controlling the memories, arithmetic circuits and selecting circuits.

Each of the three data flip-flops outputs a signal delayed by one clock so that four data 300, 301, 302, and 303 (corresponding to the brightness values K0, K1, K2 and K3, respectively) including the input signal, which are necessary to calculate an interpolation value are sent to the first selecting circuit 4. Each of the line memories A to C stores data of one row in the horizontal direction. At the time of the interpolation in the vertical direction which will be described hereinlater, necessary data is called. The first selecting circuit 4 performs the selection of data and switching of the interpolation direction between the horizontal and vertical directions and outputs a result to an arithmetic circuit section at the post stage.

In the case of the interpolation in the horizontal direction, first, in the first arithmetic circuit 5, data 304 as a difference between the data 300 and 301 and data 305 as a difference between the data 302 and 303 are calculated. Then data 306 corresponding to Xm and data 307 corresponding to Ym are calculated by the second arithmetic circuit 6 and data 308 corresponding to Zm is obtained by the third arithmetic circuit 7. Further, the data 301, 302 and 308, that is, the data K1 and K2 of the pixels on both sides and Zm are compared with each other by the second selecting circuit 8, thereby determining a final interpolation value. The final data is outputted to a display circuit (not shown) at the post stage. Table 1 is used for determining an interpolation value by the second selecting circuit 8.

TABLE 1

| Status | Output |
|---|---|
| Data 301 > Data 302<br>Data 308 > Data 301 | Data 301 |
| Data 302 > Data 301<br>Data 308 > Data 302 | Data 302 |
| Data 301 > Data 302<br>Data 308 < Data 302 | Data 302 |
| Data 302 > Data 301<br>Data 308 < Data 301 | Data 301 |
| Others | Data 308 |

Figure 4:
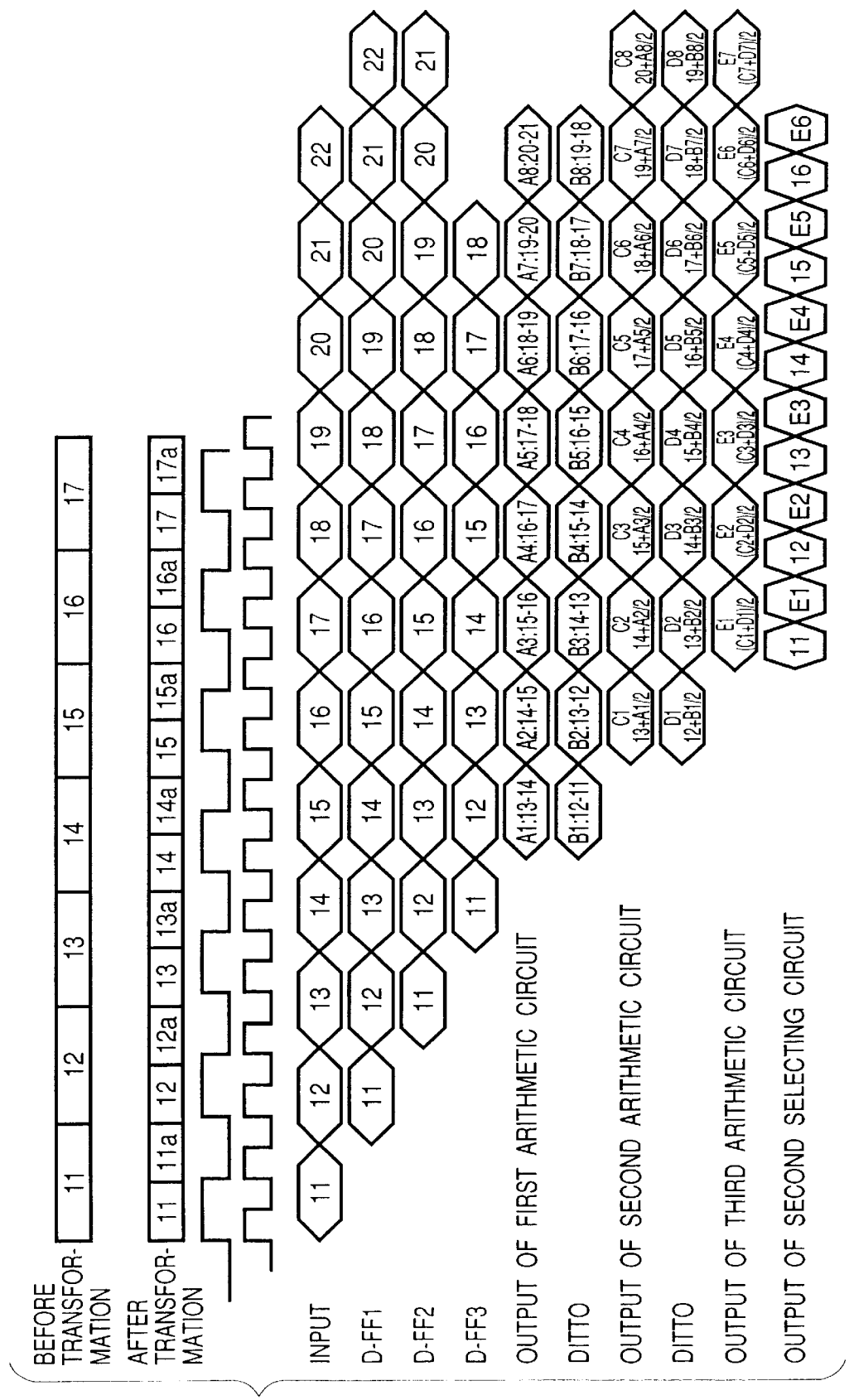
FIG. 4 is a timing chart of the second embodiment of the invention.
Figure 5:
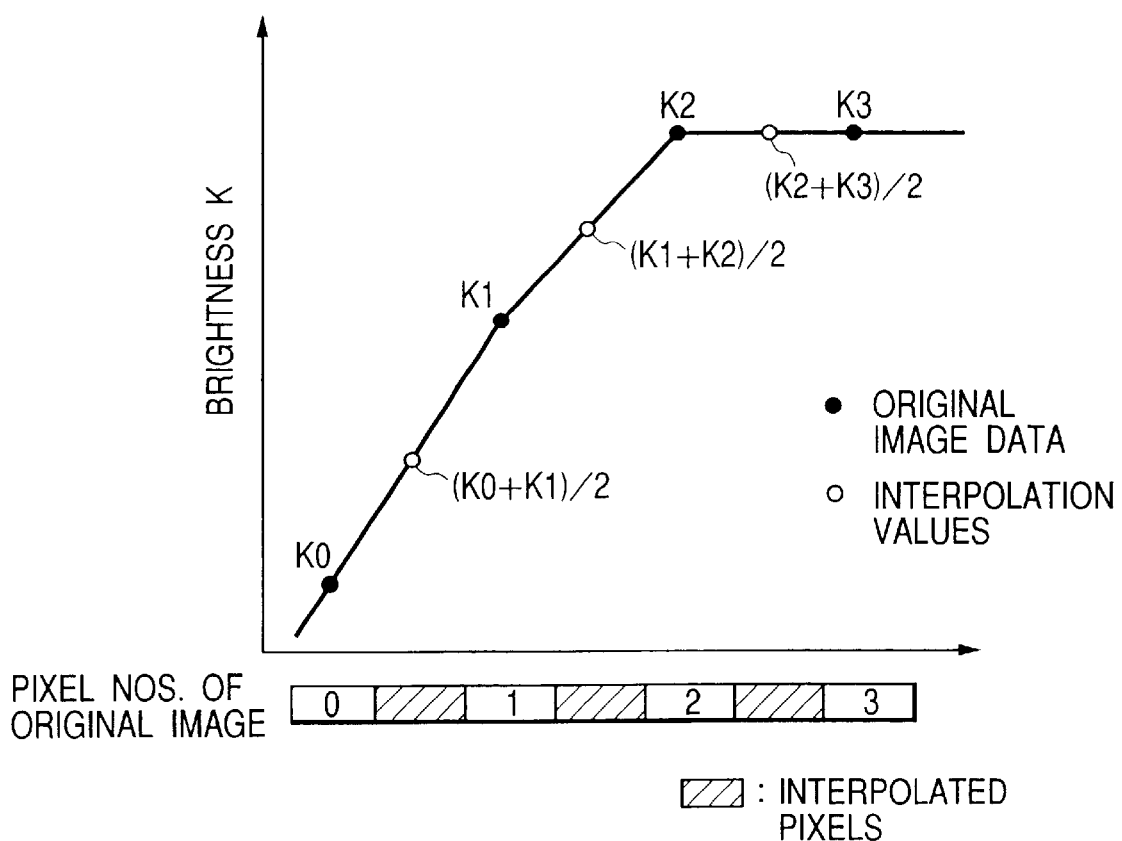
FIG. 5 is a conceptual chart showing a conventional interpolation value determining method.

FIG. 4 is a timing chart of inputs and outputs to/from circuit elements which perform the operations and shows a case of enlarging a line in the horizontal direction at a scaling factor of 2. When interpolated pixels of pixels 11, 12, 13, . . . in one row of an original image are set as 11*a*, 12*a*, 13*a*, . . . data of the interpolated pixels (E1, E2, E3, . . . in the chart) is calculated and outputted under the control of the control circuit 9 at timings shown in the chart.

Interpolation in the vertical direction is executed by using four data by reading data in the same line as in the input signal from the line memories A to C in substantially the same manner as that in the horizontal direction. In this manner, an enlarged image of four times (twice in the horizontal direction×twice in the vertical direction) is completed.

As described above, in the image display of the invention, in the interpolating process at the time of enlarging an image, an interpolation value which makes a change of data in an original image sharper as compared with the conventional technique is used. As a result, the problem that the outline is blurred due to insertion of the interpolation value is solved and an enlarged image having a clear outline can be obtained. The degree of sharpness of the outline can be selected in accordance with the contents of a display image so as not to deteriorate the texture of the object.

What is claimed is:

1. An image display comprising:

a selector to select an interpolation value Zm of data of an mth (m denotes a natural number not greater than a natural number n) interpolation pixel within a range from a Xm to a Ym which are calculated by the following equations:

the $Xm = K1 + m(K1-K0)/(n+1)$ the $Ym = K2 + (n+1-m)(K2-K3)/(n+1)$ wherein, data of a first pixel adjacent to a second pixel comprises K0, data of a second pixel comprises K1, data of a third pixel comprises K2, and data of a fourth pixel adjacent to the third pixel comprises K3; and an output mechanism coupled to the selector to output the interpolation value as data of a corresponding pixel in a display.

2. The image display according to claim 1, wherein the value Zm is calculated by an equation comprising (Xm+Ym)/2.

3. The image display according to claim 1, further comprising an adopting mechanism coupled to the output mechanism to adopt one of the data K1 and K2 which is closer to the interpolation value Zm as the corresponding pixel.

4. A method of enlarging an image comprising:

deriving a K0 related to a first pixel position; a K1 related to a second pixel position; a K2 related to a third pixel position; and a K3 related to a fourth pixel position;

deriving an Xm comprising K1+m(K1−K0)/(n+1) and a Ym comprising K2+(n+1−m)(K2−K3)/(n+1), wherein m denotes a natural number not greater than a natural number n; and deriving an interpolation value related to a fifth pixel position based on at least one of the Xm and the Ym.

5. The method of claim 4, wherein the interpolation value is derived from a function comprising Xm and Ym.

6. The method of claim 4, wherein the interpolation values is derived from a function comprising (Xm+Ym)/2.

7. The method of claim 4, further comprising displaying an interpolation pixel based on a position derived from the interpolation value.

8. The method of claim 4, further comprising selecting a second interpolation value that is closest to the interpolation value.

9. The method of claim 8, wherein the second interpolation value derives the fifth pixel position which is intermediate of the second and the third pixel positions.

10. The method of claim 4, wherein the interpolation value derives a fifth pixel position near the second and the third pixel positions.

* * * * *